US007730131B2

(12) United States Patent
Blagsvedt et al.

(10) Patent No.: US 7,730,131 B2
(45) Date of Patent: *Jun. 1, 2010

(54) CONTROLLING PUBLICATION OF PRESENCE INFORMATION

(75) Inventors: Sean O. Blagsvedt, Seattle, WA (US); Ahsan S. Kabir, Seattle, WA (US); Angela K. Butcher, Duvall, WA (US); Donna B. Andrews, Shoreline, WA (US); Peyman Oreizy, Kirkland, WA (US); Sterling M. Reasor, Bellevue, WA (US); Cornelius K. van Dock, Bellevue, WA (US); Hilary K. Palman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

This patent is subject to a terminal disclaimer.

(21) Appl. No.: 11/682,237

(22) Filed: Mar. 5, 2007

(65) Prior Publication Data
US 2007/0165819 A1    Jul. 19, 2007

Related U.S. Application Data

(63) Continuation of application No. 10/401,084, filed on Mar. 27, 2003, now Pat. No. 7,216,147.

(51) Int. Cl.
*G06F 15/16* (2006.01)
*G06F 3/00* (2006.01)
*G06F 15/177* (2006.01)
*H04L 12/66* (2006.01)

(52) U.S. Cl. .......... 709/204; 709/227; 715/736; 715/751; 370/352

(58) Field of Classification Search .......... 709/204, 709/227; 379/201; 715/736, 751; 370/352
See application file for complete search history.

(56) References Cited

U.S. PATENT DOCUMENTS

| 6,163,799 | A  | * | 12/2000 | Kambayashi et al. | 709/204 |
|---|---|---|---|---|---|
| 6,564,261 | B1 | * | 5/2003 | Gudjonsson et al. | 709/227 |
| 7,227,937 | B1 | * | 6/2007 | Yoakum et al. | 379/201.01 |
| 2002/0075305 | A1 | * | 6/2002 | Beaton et al. | 345/751 |
| 2002/0080170 | A1 | * | 6/2002 | Goldberg et al. | 345/748 |
| 2002/0147777 | A1 | * | 10/2002 | Hackbarth et al. | 709/205 |
| 2003/0217109 | A1 | * | 11/2003 | Ordille et al. | 709/206 |
| 2004/0003042 | A1 | * | 1/2004 | Horvitz et al. | 709/204 |
| 2004/0172455 | A1 | * | 9/2004 | Green et al. | 709/207 |
| 2004/0202117 | A1 | * | 10/2004 | Wilson et al. | 370/310 |

\* cited by examiner

*Primary Examiner*—William C Vaughn, Jr.
*Assistant Examiner*—Muktesh G Gupta
(74) *Attorney, Agent, or Firm*—Workman Nydegger

(57) ABSTRACT

A user interface is configured to identify and display each of the one or more service providers servicing the user's computing system. The interface also identifies the presence information that is being supplied to the service providers by the user's computing system for publication. The presence information that is provided to the service providers can include, but is not limited to, the name, alias, location, and network status of the user. A user can make global or discrete customized changes to the presence information that is provided to each of the service providers through the user interface. Modifications made to the presence information can also be made automatically to reflect a new condition or status in the user's presence on a network that is provided by a service provider.

19 Claims, 3 Drawing Sheets

CONTROLLING PUBLICATION OF PRESENCE INFORMATION

CROSS-REFERENCE TO RELATED APPLICATIONS

This application is a continuation of application Ser. No. 10/401,084, filed Mar. 27, 2003, entitled "CONTROLLING PUBLICATION OF PRESENCE INFORMATION", and which is incorporated here by reference in its entirety.

BACKGROUND OF THE INVENTION

1. The Field of the Invention

The present invention relates to the field of computers and, more particularly, to methods and systems for using computers to display and control an entity's presence information that is published over a computer network.

2. Background and Relevant Art

The computer industry continues to develop new and efficient means for communicating through computing devices. It is now commonplace, for example, to use a personal computing device to communicate over a network via e-mail, facsimile, instant message (IM), telephony, video teleconference (VTC), gaming application and so forth. The network service providers have also become more sophisticated, in enabling greater numbers and types of computing devices to be networked together to communicate in any of the above-identified ways.

One particular advance in the computing industry includes the developed ability of service providers to identify the computing devices that connect to their networks. In addition to identifying a computing device, many service providers have also developed the ability to obtain presence information about a user that is stored on a user's computing device and that that can be published or shared over the network with other computing devices.

The term "presence information," as defined herein, generally includes any information that describes an entity (individual, group, organization, etc.) as well as any information that describes the one or more computing devices that are associated with the entity by a service provider. Non-limiting examples of presence information include the name, alias, image, and location of an entity. Other types of presence information include the network connection of an entity's computing device with a network (e.g., Online/Offline), as well as the entity's status on the network (e.g., signed in/signed out).

Presence information is often used by a service provider to identify an entity accessing a network, as well as to determine the presence and status of the entity on the network. Some service providers also publish presence information to other parties, with or without the express consent of the entity. This can be useful to enhance the capabilities provided by a service provider, such as, for example the instant messaging capabilities provided by a service provider.

In some circumstances, however, a service provider will publish presence information that an entity does not wish to be published. For example, a user may not want their location, name, or network status to be published. In yet other circumstances a user may wish for their presence information to be published, but in a different manner than it is currently being published by the service provider.

The ability to control what presence information is published can sometimes be controlled by very sophisticated users who know how to access the cookies and file caches that are queried by a service provider to obtain the presence information. However, even for sophisticated computer users, controlling the presence information that is obtained and published by a service provider can represent an arduous task.

The desire to control publication of presence information also extends beyond service providers, to presence aware applications. In particular, there are many applications that are configured to gather and publish presence information about a user. Many of these presence aware applications provide presence information to a service provider for publication.

Accordingly, there is currently a need in the art for a simplified and user friendly method for enabling a user to view what presence information is gathered by service providers and presence aware applications and to control what, if any, presence information is published.

BRIEF SUMMARY OF THE INVENTION

The present invention is generally directed to methods and systems for enabling a user to control and customize the presence information that is obtained and published by service providers.

According to one aspect of the invention, a user interface is configured to identify and display each of the one or more service providers servicing the user's computing system. The interface also identifies the presence information that is being supplied to the service providers by the user's computing system for publication. The presence information that is provided to the service providers can include, but is not limited to, the name, alias, location, and network status of the user. The presence information provided to the service providers can also include presence information that is gathered from presence aware applications utilized by the user at the computing system.

The user can make changes to the presence information directly through the user interface that is provided by the present invention. In one embodiment, presence information is changed globally, such that all service providers are provided with the same altered/unaltered presence information. In other embodiments, a user is able to individually customize the presence information that is provided to the various service providers. In yet other embodiments, the user interface can be used to provide incorrect presence information to the service providers, as directed by the user.

In certain embodiments, the user interface enables a user to control exactly which applications can and cannot automatically publish information on the users behalf, by enabling a user to over-ride the contents of presence information that is gathered by presence aware applications.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
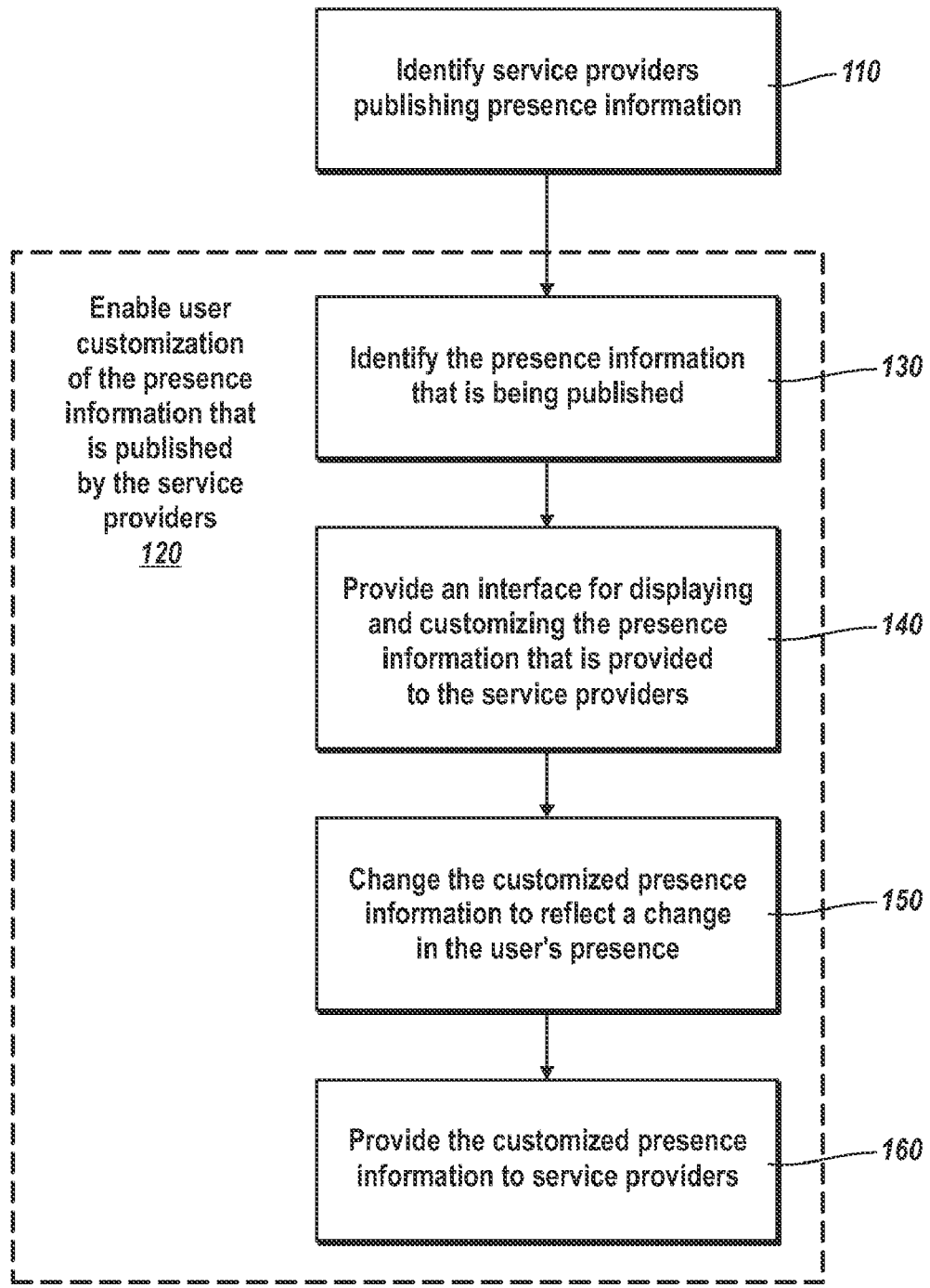
FIG. 1 illustrates a flowchart of one method for enabling a user to control the publication of presence information by service providers.

The present invention is generally related to methods and systems for controlling what presence information is published by one or more service providers.

As defined herein, the term "presence information," generally refers to the information that describes an entity (individual, group, organization, etc.) as well as any information that describes the one or more computing devices that are associated with the entity by a service provider. Non-limiting examples of presence information include the name, alias, image, and location of an entity. Other types of presence information include the network connection of an entity's computing device with a network (e.g., Online/Offline), as well as the entity's status on the network (e.g., signed in/signed out).

The term "service provider," as generally defined herein, includes a server or computing system that provides one or more computing systems access to a network that may include any number of other interconnecting computing systems. Non-limiting examples of Internet service providers, for example, include MSN, AOL, Earthlink, Juno, and AT&T.

The term "presence aware application," as generally defined herein refers to an application that a user interacts with and that acts as a proxy for the user's activity. Presence aware applications often publish presence information about the user. For example, a game application may publish information that the user is playing the game. It will be appreciated, however, that presence aware applications are not limited to gaming applications, hut extend broadly to any application that provides presence information about a user.

According to some aspects of the invention, a user's computing system provides presence information to one or more service providers, including presence information that is provided by one or more presence aware applications. A user can view and modify the presence information that is provided to the service providers through a user interface of the invention, thereby allowing the user to control exactly which applications can and cannot automatically publish information on their behalf and enabling the user to over-ride the contents of that information if the user chooses to do so. In certain embodiments, the user's presence information can also be updated automatically to reflect actual changes in the user's presence.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be appreciated that the embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hard wired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Figure 4:
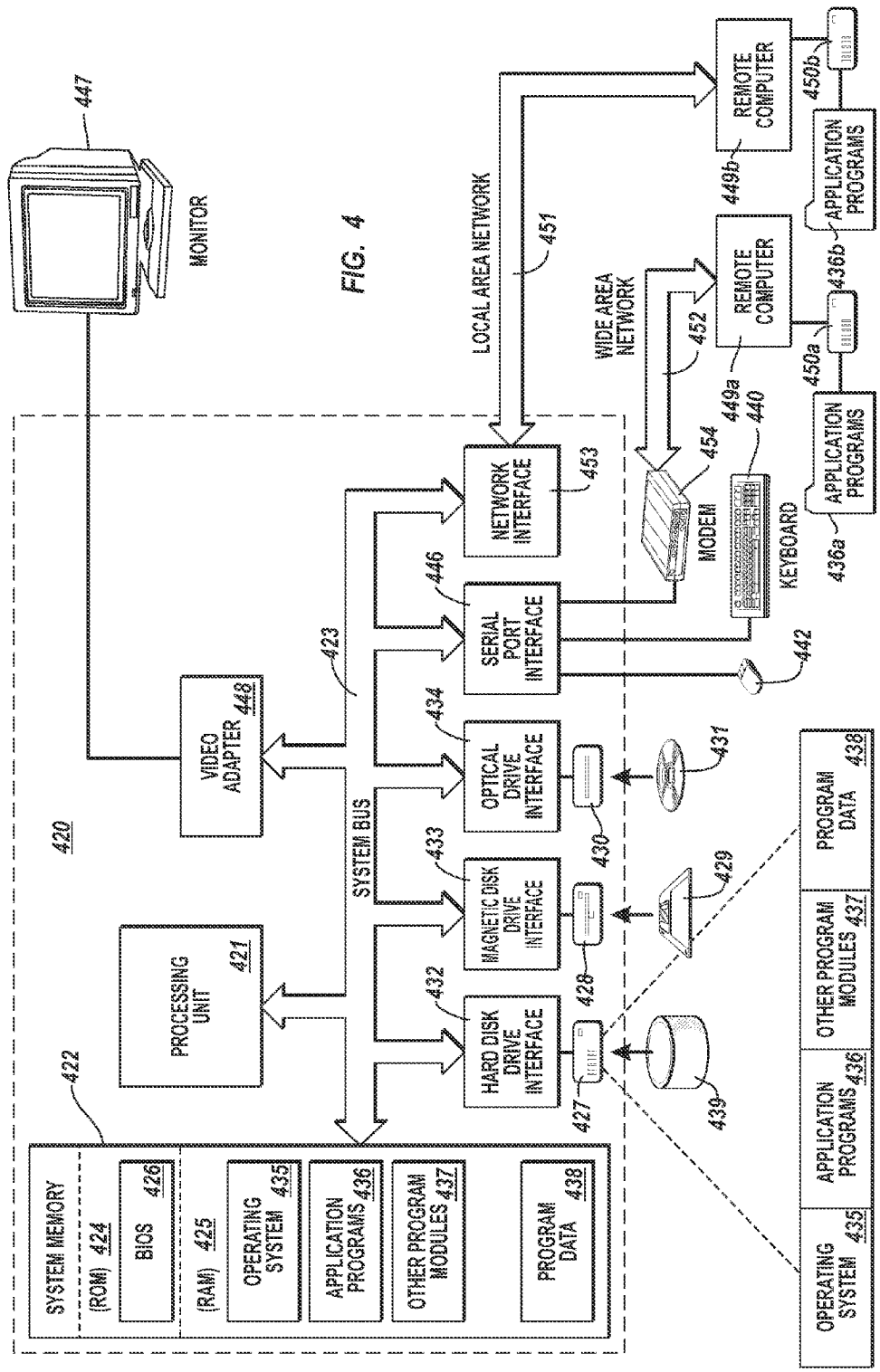
FIG. 4 illustrates one embodiment of a computing environment in which methods for controlling the publication of presence information can be implemented.

FIG. 4, which is described below in detail, illustrates one example of a computing environment in which methods of the invention may be practiced.

Controlling Publication of Presence Information

FIG. 1 illustrates a flowchart of a method for controlling the publication of presence information by one or more service providers servicing the computing system of a user. As shown, the method includes an act of identifying service providers that are publishing presence information about the user (act 110), a step for enabling user customization of the published presence information (step 120), and corresponding acts of identifying the presence information that is being published by the service providers (act 130), providing an interface for displaying and customizing the presence information (act 140), changing the customized presence information to reflect a change in the user's presence (act 150), and providing the customized presence information to the service providers (act 160). Each of the foregoing acts will now be described in more detail with specific reference to FIGS. 2-3.

Initially, the act of identifying service providers that are publishing presence information (act 110), generally includes the act of using computing modules within the user's computing system to identify service providers that are provided presence information by the user's computing system. In some embodiments, the user's computing system initiates the transfer of presence information to a service provider, such that act 110 is accomplished by identifying all service providers that are sent presence information by the computing system In other embodiments, the user's computing system merely allows a service provider to query files within the computing system that contain presence information. In these embodiments, act 110 is accomplished by identifying all service providers querying the computing system for presence information.

According to one aspect of the invention, computing modules of the user's computing system also identify the specific presence information that is being obtained/published by the service providers (act 130). This may include an act of tracking the presence information that is provided to the service providers, such as, for example, the presence information that is provided by the presence aware applications. It may also include receiving notifications from the service providers that detail the types of presence information they are publishing. This may also include monitoring the presence information that is actually published by the various service providers.

According to one embodiment of the invention, a user interface is provided to display a list of the service providers and presence information that are identified while performing acts 110 and 120, described above.

Figure 2:
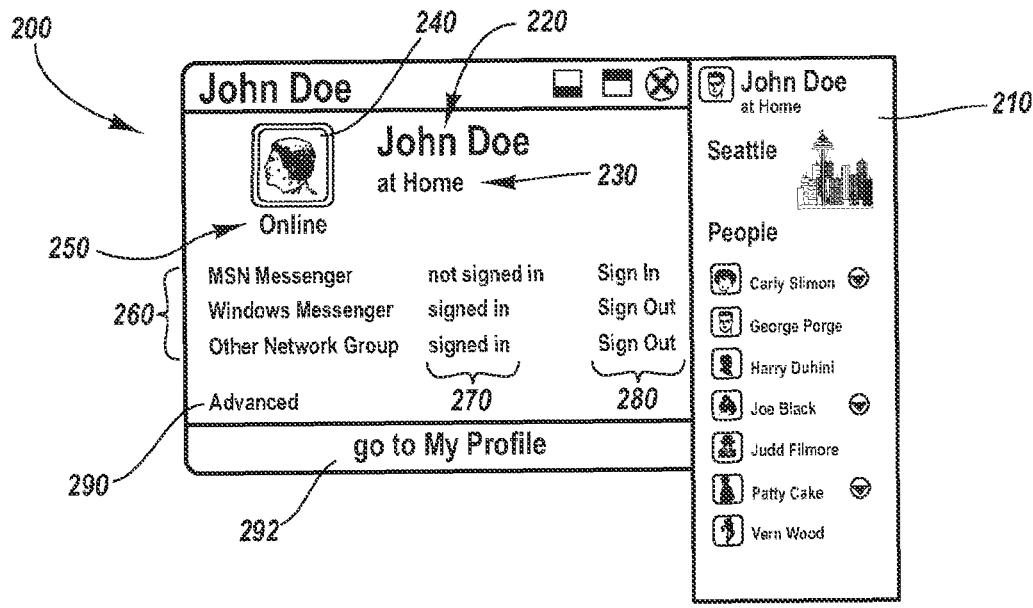
FIG. 2 illustrates one embodiment of a user interface displaying presence information that is provided to a plurality of service providers.

FIG. 2 illustrates one embodiment of the user interface 200, which can be used to display the identified service providers and presence information. According to one embodiment, the interface 200 is configured to launch whenever the interface 200 is selected, such as, for example, from a menu or a corresponding display icon. In another embodiment, the interface 200 is launched whenever the user's name is selected from a contact bar 210.

As shown, the interface 200 displays various presence information, including a name 220 (John Doe), location 230 (at Home), and image 240 associated with the user. The user's computing system network status (Online/Offline) is also displayed, indicating whether the user's computing system is presently connected to the one or more networks (e.g., World Wide Web, work Intranet, etc.) that are associated with the service providers. The interface 200 also displays a list of service providers 260 that have been identified as publishing presence information about the user (act 110). In the present embodiment, the list of service providers 260 is displayed along with additional presence information that is specific to each of the corresponding service providers 260. In particular, the user's network status (signed in/signed out) is displayed with each of the corresponding service providers.

In addition to displaying presence information and a list of service providers, the interface 200 also includes controls that can be selected to perform a desired task. For instance, a group of (sign in/sign out) controls 280 are provided for selection to enable a user to login or logout of a network associated with a service provider. An "advanced" control is also provided to take the user to a more advanced interface that can be used to customize the user's presence information and to affect settings for the interface 280. A "go to my profile" control is provided to enable a user to launch a user profile interface (not shown) that is configured to display detailed contact and presence information about a user.

The presence information that is displayed by the interface 200 can be obtained from a specialized data structure or storage location that contains all of the presence information that is supplied to the service providers 260 by the user's computing system. The presence information can also mirror actual presence data that is contained in various storage locations and that are independently queried by the service providers 260.

When the interface mirrors actual presence data contained in various storage locations, the methods of the invention may include an additional act of changing the actual presence data to correspond with any change that is made by the user at the user interface (e.g., signing in or signing out). In certain circumstances, however, a user desires only to change the presence information that is published, without changing the user's actual presence with the service provider on the network. In such circumstances, dummy files can be created and supplied to the service providers for querying, such that the dummy files can be modified to alter the user's published presence information without affecting the actual presence of the user.

It will be appreciated that a user can customize the presence information in various ways, depending in part on how the service providers obtain the presence information, as described above. In particular, if the service providers passively obtain presence information from the user's computing system, then the interface 200 can transmit the displayed presence information directly to the service provider with one or more corresponding computing modules. However, if the service providers actively query the user's computing system for presence information then dummy files can be established and modified in accordance with any changes made at the user interface. It will be appreciated that the dummy files may contain presence information that reflects a user's true presence or a user's fake presence, depending on the changes made at the interface.

In certain embodiments, for example, a user can change the presence information that displayed by the interface 200, and which is supplied to the service providers for publication, without changing the user's actual status. For example, a user can change the computing system network status 250 from "Online" to "Appear Offline" or to "Offline." This would cause the service providers 260 to publish the user's status as Offline, even though they were actually Online. The user could also change their network status 270 from "signed in" to "signed out" or "appear signed out." This would enable the user to appear invisible in the network the user is signed onto, thereby enabling the user to navigate throughout the network (e.g., chat groups) without being noticed by others in the network.

In certain embodiments, a user can also modify the presence information that is provided to the service providers from one or more presence aware applications. For example, although not shown in the present embodiment, the presence information that is displayed by the user interface can also include presence information that is specific to one or more presence aware applications. In such an embodiment, a user can selectively control what presence information is provided to the service providers for publication by identifying the presence information that is gathered from one or more presence aware applications and by utilizing the inventive user interface that displays presence information that is to be published. As described herein, the interface can include controls for controlling what presence information is actually provided to the one or more service providers for publication. In particular, the user can modify or otherwise designate what presence information, if any, is provided to the one or more service providers for publication.

Users can modify their presence information with various tools and techniques. In one embodiment, for example, a user selects the presence information they want to change and a type-in line is automatically provided to the user to enter new or modified presence information. For instance, with specific reference to FIG. 2, a user can right-click on the displayed location 230 and name 220 to launch corresponding type-in lines (not shown) that the user can populate with customized text. Any changes made to the user's presence information are then recorded to the specialized data structures and/or dummy files, described above, so that the customized presence information makes its way to the service providers for publication.

In certain embodiments, a change to the user's presence information (e.g., name or location) globally affects the presence information that is provided to all of the service providers 260 that are identified by interface 200. It will be appreciated, however, that in other embodiments the presence information can be modified on an individual basis for each of the various service providers 260. This can be useful, for example, when a user chooses to provide different presence information to different service providers.

Figure 3:
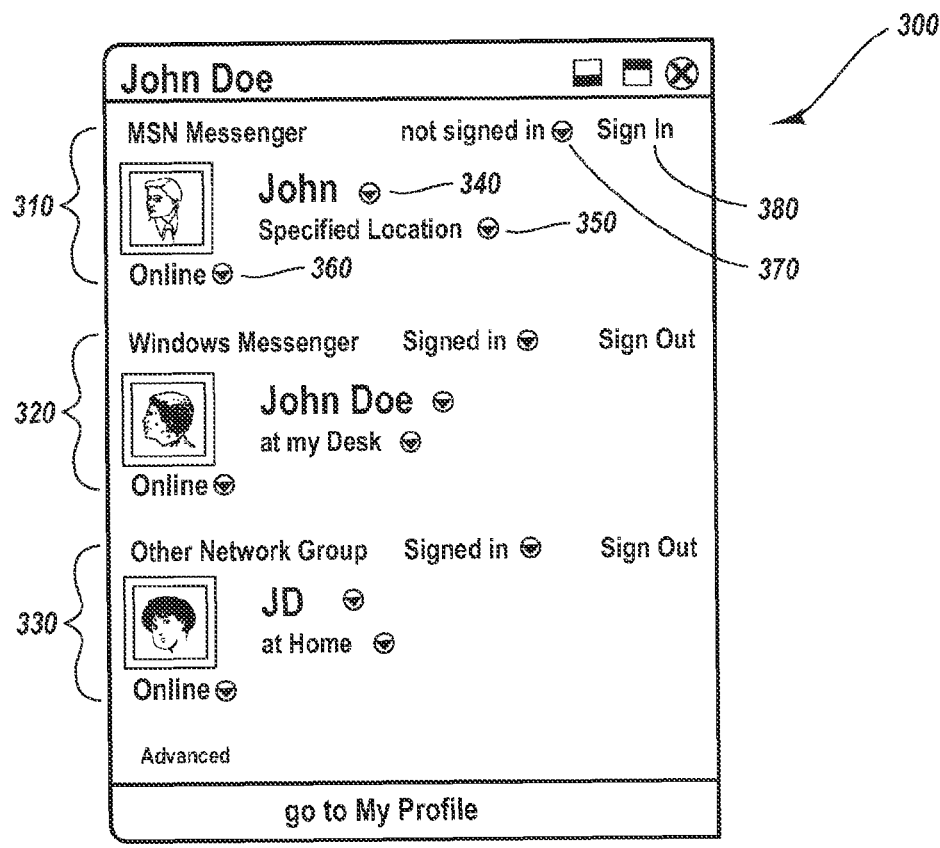
FIG. 3 illustrates one embodiment of a user interface displaying presence information and controls for modifying the presence information that is provided to various service providers.

FIG. 3 illustrates one embodiment of an interface 300 that can be used to individually customize the presence information that is provided to different service providers. The interface 300 in FIG. 3 is similar to the interface 200 in FIG. 2, but instead of grouping all of the service providers together as shown in FIG. 2, interface 300 separates the service providers (MSN Messenger, Windows Messenger, Other Network Group) and the presence information they publish into three separate groupings (310, 320, 330). As shown, the presence information provided to each of the service providers for publication can vary between the various service providers. In particular, the user's name provided to MSN Messenger is John, whereas the name provided to Windows Messenger is John Doe, and whereas the name provided to the Other Network Group is JD. The location presence information is varied for the different service providers (e.g., specified location, at my desk, at home).

In this embodiment, some of the presence information is displayed with pull-down menu control objects (340, 350, 360 and 370). When any of the pull-down menu control objects (340, 350, 360 and 370) are selected, then a list of options is displayed for the user to select from. For example, when the control object 340 is selected, then a list of possible names and aliases is provided for the user to select from. When the control object 350 is selected, then a list of possible locations is provided for the user to select from. When the control object 360 is selected, then a list of possible computing system network statuses is displayed for the user to select from. Finally, when the control object 370 is selected, then the user is presented a list of possible user network statuses to choose from.

In one embodiment, the pull-down menu lists are populated with selections intelligently obtained from databases stored on the user's computing system. The lists can also be populated with customized options supplied by a user, such as, for example, in an advanced mode (not shown) of the interface 300. In yet other embodiments, the interface 300 provides selections that the service providers have indicated are conforming and appropriate presence information options.

One benefit of enabling a user to modify their presence information, as generally described above, is to allow a user to control how they are viewed by different groups of people. For example, a user can set their presence information corresponding with their work service provider and network to reflect that they are presently at work (e.g., "at my desk"), while at the same time reflecting over a gaming network to friends and gaming colleagues that the user is really at home or gaming. Other presence information can also be changed to provide other impressions (true or false) about the user.

In certain other non-limiting examples of customizing presence information, a user can customize their associated images, names, network status (Signed in/Signed out/Appear Signed out), and computing system network status (Online/Offline/Appear Offline). The customized presence information is then provided to the various service providers (act 160) for publication, as described above, thereby enabling control over the presence information that is published by the various service providers.

With reference to FIG. 1, certain methods of the invention also include the act of changing the customized presence information to reflect a change in the user's presence (act 150). For example, if a user customizes their presence information to reflect that they are Online and at work, even though they are really Online and at home, the effect of a network crash with the work server could result in the user's presence information being automatically updated to reflect that the user is Offline and at work or Offline and at home. It will be appreciated, however, that the act of automatically updating the user's presence information is not a necessary act for each method of the invention. Likewise, it will be appreciated that not all of the corresponding acts 130, 140, 150 and 160 are required to enable user customization of the presence information that is published by the service providers (step 120). Rather, step 120 may include any corresponding acts that are suitable for enabling customization of the user's presence information, as described herein. For example, step 120 may include modifying a user's presence information that is provided by presence aware applications. Accordingly, the interface and methods of the invention can operate as a gateway between presence-aware applications and service providers that actually publish presence information, thereby allowing the user to control exactly which applications can and cannot automatically publish information on their behalf and override the contents of that information if the user chooses to do so.

In summary, the interfaces and methods of the invention enable a user to view and modify their presence information that is published. The presence information displayed by the interfaces of the invention generally corresponds to the user's actual presence on the one or more networks provided by the service providers. However, the user is able to edit the displayed presence information without necessarily affecting the user's actual presence on the network. Accordingly, the customized presence information may accurately or inaccurately reflect the user's actual presence. In certain embodiments, the user's presence information can also be modified globally and individually, to accommodate a user's needs and desires to publish different information to different people, as described above.

Operating Environment

Those skilled in the art will also appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hard wired or wireless links) through a communications network. In a distributed computing environment, program modules may be located in both local and remote memory storage devices.

FIG. 4 and the following discussion are intended to provide a brief, general description of a suitable computing environment for implementing certain elements of the invention.

However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 4, an exemplary system for implementing certain elements of the invention includes a general purpose computing system in the form of a conventional computer 420, including a processing unit 421, a system memory 422 comprising computer readable media, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. These storage media can also be used to store data structures associating correction coefficients with gamma values, as described above. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In this context, the video adapter 448 is considered to include a GPU as described above. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 20 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that provides presence information to a service provider that is configured to provide the computing system access to a network, the computing system comprising a processor and memory storing instructions which, when executed by the processor, implement a method for enabling the user to control the presence information that is provided to the service provider for publication, the method comprising:

an act of providing a user interface in a user computing system, the user interface being configured to receive first presence information of a user for a service provider and to display the first presence information in one or more display frames of the user interface on a display screen;

an act of simultaneously displaying second presence information corresponding with a user's actual presence on the network within one or more of the display frames of the user interface on the display screen;

an act of enabling the user to provide user input at the user interface to dynamically edit the first presence information to reflect a change in a user's published presence on the network but without affecting the user's actual presence on the network; and an act of providing the displayed first presence information to the service provider for publication.

2. A method as recited in claim 1, wherein the first presence information includes a user network status indicating whether the user is logged onto the network.

3. A method as recited in claim 2, wherein the first presence information further includes a computing system network status indicating whether the computing system is currently connected over a connection with the network.

4. A method as recited in claim 1, wherein the first presence information includes at least one of a name, location and image associated with the user.

5. A method as recited in claim 1, further including an act of receiving user input editing the first presence information.

6. A method as recited in claim 5, wherein receiving user input editing the first presence information is received without causing a change in the user's actual presence on the network.

7. A method as recited in claim 5, wherein the first presence information is edited to inaccurately reflect a user's actual presence on the network.

8. A method as recited in claim 5, further including an act of receiving user input editing the first presence information with at least one of a type-in line or a pull-down menu.

9. A method as recited in claim 5, further comprising an act of, in response to receiving user input editing the displayed first presence information, changing the first presence information globally for the service providers.

10. A method as recited in claim 5, further comprising an act of, in response to receiving user input editing the first presence information, individually customizing the presence information provided to the service provider.

11. A method as recited in claim 1, further including an act of displaying the service provider with the first presence information.

12. A method as recited in claim 1, further including an act of updating the first presence information to reflect a change in the user's actual presence on the network.

13. A method as recited in claim 1, wherein the first presence information is actually published by the service provider.

14. A computer program product comprising computer-readable storage media having stored thereon computer-executable instructions that, when executed by a processor, implements a method comprising:

displaying a user interface, the user interface configured to receive first presence information of a user for a service provider;

receiving user input at the user interface to dynamically edit the displayed first presence information to reflect a change in the user's published presence on a network associated with the first service provider; and sending the edited first presence information to the service provider for publication.

15. The computer program product of claim 14, wherein the first presence information is edited to inaccurately reflect a user's actual presence on the network.

16. The computer program product of claim 14, further including updating the first presence information to reflect a change in the user's actual presence on the network.

17. A computing device having a presence aware application that provides presence information to a service provider for publication over a network, the computing device being configured to enable a user to control the presence information that is provided to the service provider for publication, the computing device comprising:

a processor; and computer readable storage media having stored thereon computer-executable instructions that, when implemented by the processor perform a method comprising:

displaying a first presence information of a user for a service provider, wherein the first presence information is published;

displaying a second presence information of the user for the service provider, wherein the second presence information represents actual presence status;

receiving user input to dynamically edit the first presence information to reflect a change in the user's published presence on a network associated with the first service provider; and sending the edited first presence information to the service provider for publication.

18. The computer device of claim 17, wherein the first presence information is edited to inaccurately reflect a user's actual presence on the network.

19. The computer device of claim 18, further including updating the first presence information to reflect a change in the user's actual presence on the network.

* * * * *

UNITED STATES PATENT AND TRADEMARK OFFICE
CERTIFICATE OF CORRECTION

| | | |
|---|---|---|
| PATENT NO. | : 7,730,131 B2 | Page 1 of 1 |
| APPLICATION NO. | : 11/682237 | |
| DATED | : June 1, 2010 | |
| INVENTOR(S) | : Sean O. Blagsvedt et al. | |

It is certified that error appears in the above-identified patent and that said Letters Patent is hereby corrected as shown below:

On The Title Page:

Item (75), under "Inventors" column 1, line 7, delete "Dock," and insert -- Dok, --, therefor.

Signed and Sealed this
Eighteenth Day of January, 2011

David J. Kappos
*Director of the United States Patent and Trademark Office*